(12) United States Patent
Robert et al.

(10) Patent No.: US 7,825,183 B2
(45) Date of Patent: Nov. 2, 2010

(54) PLASTICIZING SYSTEM FOR A RUBBER COMPOSITION

(75) Inventors: Pierre Robert, Clermont-Ferrand (FR); Stéphanie De Landtsheer, Clermont-Ferrand (FR); Jean-Michel Favrot, Cournon d'Auvergne (FR); Garance Lopitaux, Bellenaves (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 230 days.

(21) Appl. No.: 11/666,720

(22) PCT Filed: Oct. 28, 2005

(86) PCT No.: PCT/EP2005/011564

§ 371 (c)(1),
(2), (4) Date: Apr. 30, 2007

(87) PCT Pub. No.: WO2006/061064

PCT Pub. Date: Jun. 15, 2006

(65) Prior Publication Data

US 2008/0009564 A1  Jan. 10, 2008

(30) Foreign Application Priority Data

Oct. 28, 2004  (FR) .................................. 04 11499

(51) Int. Cl.
*C08K 5/01* (2006.01)
(52) U.S. Cl. ..................................................... 524/476
(58) Field of Classification Search ................. 524/474, 524/476
See application file for complete search history.

(56) References Cited

U.S. PATENT DOCUMENTS 3,938,574 A  2/1976  Burmester et al.

2002/0045697 A1  4/2002  Sohnen et al.
2007/0082991 A1*  4/2007  Chassagnon et al. ........ 524/313

FOREIGN PATENT DOCUMENTS

| EP | 0 775 719 A | 5/1997 |
| EP | 0 830 387 B | 3/1999 |
| JP | 11-130909 | 5/1999 |
| WO | WO 96/40801 | 12/1996 |

OTHER PUBLICATIONS

Database CA 'Online!, Chemical Abstracts Service, Columbus, Ohio V. Null, "Safe Process Oils for Tires with Low Environmental Impact" Database accession No. 2000:16340, Kautschuk Gummi Kunststoffe, vol. 52, No. 12, 799-800, 802-805, 1999.
Database CA 'Online!, Chemical Abstracts Service, Columbus, Ohio J. Bowman, et al., "The influence of Non-Toxic Extender Oil on SBR Performances", Database accession No. 2004:497461, KGK, Kautschuk Gummi Kunststoffe, vol. 57 No. 1-2, pp. 31-36, 2004.

* cited by examiner

*Primary Examiner*—Peter Szekely
(74) *Attorney, Agent, or Firm*—Cohen Pontani Lieberman & Pavane LLP

(57) ABSTRACT

Plasticising system which can be used for the plasticizing of a diene rubber composition, characterized in that it is based on an MES or TDAE oil and on $C_5$ fraction/vinylaromatic copolymer resin, in particular a copolymer of a $C_5$ fraction and of stirene resin. Rubber composition exhibiting an improved abrasion and cut resistance, said composition being based on at least a diene elastomer, a reinforcing filler, a crosslinking system and a plasticising system comprising between 5 and 35 phr of an MES or TDAE oil and between 5 and 35 phr of such a resin (phr=parts by weight per 100 parts of elastomer). Process for preparing such a composition, use of said composition for the manufacture of a finished article or of a semi-finished product intended for a motor vehicle ground-contact system, in particular a tire and a tread of such a tire.

49 Claims, No Drawings

PLASTICIZING SYSTEM FOR A RUBBER COMPOSITION

RELATED APPLICATION

This is a U.S. National Phase Application under 35 USC 371 of International Application PCT/EP2005/011564, filed on Oct. 28, 2005.

FIELD OF THE INVENTION

The present invention relates to rubber compositions intended in particular for the manufacture of tires or semi-finished products for tires. It relates more particularly to the plasticising systems which can be used for plasticising such compositions.

BACKGROUND OF THE INVENTION

Rubber compositions for tires comprise, in a known way, plasticising agents used for the preparation or synthesis of certain diene elastomers, for improving the processability of said compositions in the raw state and some of their use properties in the cured state, such as, for example, in the case of tire treads, their grip on wet ground or also their abrasion and cut resistance.

For a very long time, it has essentially been oils derived from petroleum and which are highly aromatic, known under the name of DAE ("Distillate Aromatic Extracts") oils, which have been used to perform this function of plasticising agent. Many tire manufacturers are today, for environmental reasons, envisaging gradually replacing these DAE oils by substitute oils of the "non-aromatic" type, in particular by oils known as "MES" ("Medium Extracted Solvates") or "TDAE" ("Treated Distillate Aromatic Extracts") which are characterized by a very low level of polyaromatics (approximately 20 to 50 times less).

The Applicants have noted that the replacement, in tire rubber compositions, of DAE aromatic oils by these MES or TDAE oils is unexpectedly reflected by a reduction in the abrasion and cut resistance of said compositions, it being possible for this reduction to be even totally unacceptable in certain applications, in particular with regard to the problem of chipping of tire treads.

"Chipping" (or "scaling") is a known damaging mechanism which corresponds to lamellar surface pieces, in the form of scales, being torn off from the constituent "rubber" (or rubber composition) of the treads under certain aggressive running conditions. This problem is encountered in particular with regard to tires for off-road vehicles or vehicles found on construction or civil engineering sites, which have to run over different types of soils, some of them stony and relatively aggressive; it has, for example, been described, along with some solutions for overcoming it, in the patent documents EP-A-0 030 579, FR-A-2 080 661 (or GB-A-1 343 487), or also in patent U.S. Pat. Nos. 3,927,144 and 4,968,764, which recommend, for overcoming it, the use of cyclopentadiene-based hydrocarbon resins.

On continuing their research, the Applicants have discovered that the replacement of a portion of these MES or TDAE oils by another specific plasticising agent makes it possible not only to solve the above problem but, which is even more surprising, to also improve the abrasion and cut resistance of the rubber compositions using conventional aromatic oils as plasticising agent.

Consequently, a first aspect of the invention is a rubber composition based on at least a diene elastomer, a reinforcing filler, a plasticising system and a crosslinking system, characterized in that said plasticising system comprises (phr=parts by weight per 100 parts of elastomer):
  between 5 and 35 phr of an MES or TDAE oil;
  between 5 and 35 phr of a $C_5$ fraction/vinylaromatic copolymer resin.

Another aspect of the invention is a process for preparing a rubber composition having an improved abrasion and cut resistance, this composition being based on a diene elastomer, a reinforcing filler, a plasticising system and a crosslinking system, said process comprising the following stages:
  incorporating in a diene elastomer, during a first referred to as "non-productive" stage, at least a reinforcing filler and a plasticising system, by kneading thermomechanically the whole, in one or more goes, until a maximum temperature of between 110° C. and 190° C. is reached;
  cooling the entire mixture to a temperature of less than 100° C.;
  subsequently incorporating, during a second referred to as "productive" stage, the crosslinking system;
  kneading everything until a maximum temperature of less than 110° C. is reached, and being characterized in that said plasticising system comprises:
  between 5 and 35 phr of an MES or TDAE oil;
  between 5 and 35 phr of a resin formed of $C_5$ fraction/vinylaromatic copolymer.

Another aspect of the invention relates, to a plasticising system which can be used for the plasticizing of a diene rubber composition, said system comprising, in combination, an MES or TDAE oil and a resin formed of $C_5$ fraction/vinylaromatic copolymer, and to the use of such a system for the plasticizing of a diene rubber composition.

According to a preferred embodiment, the resin formed of $C_5$ fraction/vinylaromatic copolymer comprises a weight fraction of cyclopentadiene and/or dicyclopentadiene which is less than 30%, which has proven to be favorable to the low-temperature hysteresis/high-temperature hysteresis compromise which a person skilled in the art of tires associates in a known way with the grip on wet ground and rolling resistance compromise.

Another aspect of the invention is the use of a composition according to the invention for the manufacture of a finished article or of a semi-finished product made of rubber intended for any motor vehicle ground-contact system, such as tire, internal safety support for a tire, wheel, rubber spring, elastomeric joint, other suspension element and vibration damper.

Another aspect of the invention is the use of a composition according to the invention for the manufacture of tires or semi-finished products made of rubber intended for these tires, these semi-finished products preferably being chosen from the group consisting of treads, crown reinforcing plies, sidewalls, carcass reinforcement plies, beads, protectors, underlayers, rubber blocks and other internal rubbers, in particular decoupling rubbers, intended to provide the bonding or the interface between the abovementioned regions of the tires.

Another aspect of the invention is the use of a composition according to the invention for the manufacture of a tire tread exhibiting in particular an improved cut and chipping resistance.

Another aspect of the invention is the finished articles and semi-finished products made of rubber themselves, in particular tires and semi-finished products for tires, when they comprise an elastomeric composition in accordance with the invention. The tires in accordance with the invention are intended in particular for passenger vehicles, such as two-wheel vehicles (motor cycles, bicycles), industrial vehicles chosen from vans, heavy-duty vehicles, i.e. subway, bus, heavy road transportation vehicles (trucks, tractors, trailers) or off-road vehicles, heavy agricultural vehicles or earthmoving equipment, planes, and other transportation or handling vehicles.

The invention and its advantages will be more easily understood in the light of the detailed description and of the exemplary embodiments which follow.

DETAILED DESCRIPTION

I.—MEASUREMENTS AND TESTS

The rubber compositions are characterized, after curing, as indicated below.

I-1. Shore A Hardness

The Shore A hardness of the compositions after curing is assessed in accordance with standard ASTM D 2240-86.

I-2. Tensile Tests

These tests make it possible to determine the elasticity stresses and the properties at break. Unless otherwise indicated, they are carried out in accordance with French standard NF T 46-002 of Sep. 1988. The nominal secant moduli (or apparent stresses, in MPa) are measured in second elongation (i.e., after a cycle of accommodation) at 10% elongation (recorded as M10), 100% elongation (M100) and 300% elongation (M300).

I-3. Dynamic Properties

The dynamic properties $\Delta G^*$ and $\tan(\delta)_{max}$ are measured on a viscosity analyzer (Metravib VA4000) according to standard ASTM D 5992-96. The response of a sample of vulcanized composition (cylindrical test specimen with a thickness of 2 mm and with a cross section of 315 mm$^2$), subjected to a simple alternating sinusoidal shear stress, at a frequency of 10 Hz, during a temperature sweep from −80° C. to +100° C., under a stationary stress of 0.34 MPa, is recorded: the maximum value for tan δ observed is recorded (i.e., $\tan(\delta)_{max}$ in "temperature"). The sample of composition is also subjected, at a temperature of 23° C., to a strain amplitude sweep from 0.1% to 50% (outward cycle) and then from 50% to 0.1% (return cycle): the result made use of is the complex dynamic shear modulus (G*). The difference in complex modulus ($\Delta G^*$) between the values at 0.1% and at 50% strain (Payne effect) is shown for the return cycle.

I-4. Cut and Chipping Resistance

The cut and chipping resistance of the rubber compositions is evaluated through a running test on tires the treads of which are composed of said compositions.

The test is carried out at a moderate running rate (less than 60 km/h), on two successive circuits:
  a first running on a circuit made of stony (stones with a large particle size) beaten earth intended to weaken the tread in the form of cuts and other surface attacks on the constituent rubber slabs of its tread pattern;
  a second running on a very convoluted tarred circuit intended to "reveal" the chipping as a result of pieces of rubber being torn off (in the form of scales) along the weakened planes.

On conclusion of the running test, the state of the treads is evaluated, on the one hand visually (photographs), by the assigning of a grade (according to a scale of seriousness from 1 to 10), on the other hand by the measurement of the loss in weight. The chipping resistance is finally assessed by a relative overall grade (base 100 with respect to a reference product).

II. EMBODIMENTS OF THE INVENTION

The rubber composition according to the invention, which can be used in particular for the manufacture of a tire or of a tire tread, is based on at least a diene elastomer, a reinforcing filler, a crosslinking system and a specific plasticising system.

The expression composition "based on" is to be understood as meaning a composition comprising the mixture and/or the reaction product of the various constituents used, some of these base constituents being liable to, or intended to, react together, at least in part, during the various phases of manufacture of the composition, in particular during its crosslinking or vulcanization.

In the present description, unless expressly indicated otherwise, all the percentages (%) indicated are % by weight.

II-1. Diene Elastomer

The term "diene" elastomer or rubber should be understood as meaning, in a known way, an (one or more are understood) elastomer resulting at least in part (i.e., homopolymer or a copolymer) from diene monomers (monomers carrying two carbon-carbon double bonds which may or may not be conjugated).

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used in the compositions in accordance with the invention is understood more particularly to mean:
  (a) any homopolymer obtained by polymerization of a conjugated diene monomer having from 4 to 12 carbon atoms;
  (b) any copolymer obtained by copolymerization of one or more conjugated dienes with one another or with one or more vinylaromatic compounds having from 8 to 20 carbon atoms;
  (c) a ternary copolymer obtained by copolymerization of ethylene and of an α-olefin having 3 to 6 carbon atoms with a nonconjugated diene monomer having from 6 to 12 carbon atoms, such as, for example, the elastomers obtained from ethylene and propylene with a nonconjugated diene monomer of the abovementioned type, such as, in particular, 1,4-hexadiene, ethylidenenorbornene or dicyclopentadiene;
  (d) a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers may have any microstructure which depends on the polymerization conditions used, in particular on the presence or absence of a modifying and/or randomizing agent and on the amounts of modifying and/or randomizing agent employed. The elastomers may, for example, be block, random, sequential or microsequential blocks and may be prepared in dispersion or in solution; they may be coupled and/or star-branched or also functionalized with a coupling and/or star-branching or functionalization agent.

The following are suitable: polybutadienes, in particular those having a content of 1,2-units 1,2-bonds of the butadiene part of between 4% and 65% and a content of trans-1,4-bonds of between 20% and 80%, butadiene/isoprene copolymers, in particular those having an of between 4% and 80% or those having a content of cis-1,4-units of greater than 80%, polyisoprenes, butadiene/styrene copolymers and in particular those having a styrene content of between 5% and 50% by weight and more particularly between 20% and 40%, a content of isoprene content of between 5% and 90% by weight and a glass transition temperature (Tg, measured according to ASTM D3418) of −40° C. to −80° C., or isoprene/styrene copolymers, in particular those having a styrene content of between 5% and 50% by weight and a Tg of between −25° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any butadiene/styrene/isoprene copolymer having a Tg of between −20° C. and −70° C., are suitable in particular.

To sum up, the diene elastomer of the composition according to the invention is preferably chosen from the group of the highly unsaturated diene elastomers consisting of polybutadienes (abbreviated to "BR"), polyisoprenes (IR), natural rubber (NR), butadiene copolymers, isoprene copolymers and the blends of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/styrene copolymers (SBIR).

According to a specific embodiment, the diene elastomer is majoritarily (that is to say, for more than 50 phr) an SBR, whether an SBR prepared in emulsion ("E-SBR") or an SBR prepared in solution ("S-SBR"), or an SBR/BR, SBR/NR (or SBR/IR) or also BR/NR (or BR/IR) blend. In the case of an SBR elastomer, use is made in particular of an SBR having a styrene content of between 20% and 30% by weight, a content of vinyl bonds of the butadiene part of between 15% and 65%, a content of trans-1,4-bonds of between 15% and 75% and a Tg of between −20° C. and −55° C.; such an SBR may advantageously be used as a blend with a BR preferably having more than 90% of cis-1,4-bonds.

According to another specific embodiment, the diene elastomer is majoritarily (for more than 50 phr) an isoprene elastomer. This is the case in particular when the compositions of the invention are intended to constitute, in the tires, rubber matrices of certain treads (for example for industrial vehicles), of crown reinforcing plies (for example of working plies, protection plies or hooping plies), of carcass reinforcing plies, of sidewalls, of beads, of protectors, of underlayers, of rubber blocks and other internal rubbers providing the interface between the abovementioned regions of the tires.

The term "isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the blends of these elastomers. Mention will in particular be made, among isoprene copolymers, of isobutene/isoprene copolymers (butyl rubber—IIR), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4-polyisoprene; use is preferably made, among these synthetic polyisoprenes, of the polyisoprenes having a level (mol %) of cis-1,4-bonds of greater than 90%, more preferably still of greater than 98%.

According to another specific embodiment, in particular when it is intended for a tire sidewall or for a airtight internal rubber of a tubeless tire (or other air-impermeable component), the composition in accordance with the invention may contain at least one essentially saturated diene elastomer, in particular at least one EPDM copolymer or one butyl rubber (optionally chlorinated or brominated), whether these copolymers are used alone or as a blend with highly unsaturated diene elastomers as mentioned above, in particular NR or IR, BR or SBR.

According to another preferred embodiment of the invention, the rubber composition comprises a blend of a (one or more) "high Tg" diene elastomer exhibiting a Tg of between −65° C. and −10° C. and of a (one or more) "low Tg" diene elastomer exhibiting a Tg of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a level of cis-1,4-structures preferably of greater than 95%), BIRs, SIRs, SBIRs and the blends of these elastomers. The low Tg elastomer preferably comprises butadiene units according to a level at least equal to 70%; it preferably consists of a polybutadiene (BR) exhibiting a level of cis-1,4-structures of greater than 90%.

According to a specific embodiment of the invention, the rubber composition comprises, for example, from 40 to 100 phr, in particular from 50 to 100 phr, of a high Tg elastomer as a blend with 0 to 60 phr, in particular from 0 to 50 phr, of a low Tg elastomer, for example 100 phr of one or more copolymers of styrene and of butadiene prepared in solution.

According to another specific embodiment of the invention, the diene elastomer of the composition according to the invention comprises a blend of a BR (as low Tg elastomer) exhibiting a level of cis-1,4-structures of greater than 90% with an S-SBR or an E-SBR (as high Tg elastomer).

The compositions of the invention may comprise a single diene elastomer or a blend of several diene elastomers, it being possible for the diene elastomer or elastomers to be used in combination with any type of synthetic elastomer other than a diene elastomer, or even with polymers other than elastomers, for example thermoplastic polymers.

II-2. Reinforcing Filler

Use may be made of any type of reinforcing filler known for its capabilities of reinforcing a rubber composition which can be used for the manufacture of tires, for example an organic filler, such as carbon black, or a reinforcing inorganic filler, such as silica, with which a coupling agent is associated.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772).

The term "reinforcing inorganic filler" is to be understood, in the present patent application, by definition, as meaning any inorganic or mineral filler, whatever its color and its origin (natural or synthetic), also known as "white" filler, "clear" filler or even "non-black filler", in contrast to carbon black, capable of reinforcing, by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of balls or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used may be any reinforcing silica known to a person skilled in the art, in particular any precipitated or pyrogenic silica exhibiting a BET surface and a CTAB specific surface both of less than 450 m$^2$/g, preferably from 30 to 400 m$^2$/g. Mention will be made, as highly dispersible ("HD") precipitated silicas, for example, of the Ultrasil 7000 and Ultrasil 7005 silicas from Degussa, the Zeosil 1165MP, 1135MP and 11 15MP silicas from Rhodia, the Hi-Sil EZ150G silica from PPG, the Zeopol 8715, 8745 and 8755 silicas from Huber or the silicas with a high specific surface as disclosed in application WO 03/16387 (or US2005/0004297). Mention may be made, as examples of reinforcing aluminas, of the "Baikalox" "A125" or "CR125" aluminas from Baïkowski, the "APA-100RDX" alumina from Condea, the "Aluminoxid C" alumina from Degussa or the "AKP-G015" alumina from Sumitomo Chemicals.

Mention may also be made, as other examples of inorganic filler capable of being used, of reinforcing aluminum (oxide) hydroxides, titanium oxides or silicon carbides (see, for example, application WO 02/053634 or US2004/0030017).

When the compositions of the invention are intended for tire treads with a low rolling resistance, the reinforcing inorganic filler used, in particular if it is silica, preferably has a BET surface of between 45 and 400 m$^2$/g, more preferably of between 60 and 300 m$^2$/g.

Preferably, the level of total reinforcing filler (carbon black and/or reinforcing inorganic filler) is between 20 and 200 phr, more preferably between 30 and 150 phr, the optimum being in a known way different depending on the specific applications targeted: the level of reinforcement expected with regard to a bicycle tire, for example, is, of course, less than that required with regard to a tire capable of running at high speed in a sustained manner, for example a motor cycle tire, a tire for a passenger vehicle or a tire for a commercial vehicle, such as a heavy-duty vehicle.

For coupling the reinforcing inorganic filler to the diene elastomer, use is made, in a known way, of an at least bifunctional coupling agent (or bonding agent) intended to provide a sufficient connection, of chemical and/or physical nature, between the inorganic filler (surface of its particles) and the diene elastomer, in particular bifunctional organosilanes or polyorganosiloxanes.

Use is made in particular of silane polysulfides, referred to as "symmetrical" or "asymmetrical" depending on their specific structure, as disclosed, for example, in applications WO03/002648 (or US2005/0016651) and WO03/002649 (or US2005/0016650).

Particularly suitable, without the definition below being limitative, are what are called "symmetrical" polysulphurised silanes which satisfy the following general formula (I):

$$Z-A-S_n-A-Z, \text{ in which:} \quad (1)$$

n is an integer from 2 to 8 (preferably from 2 to 5);

A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the formulae below:

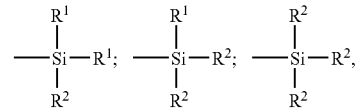

in which:

the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl), the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulfides corresponding to the above formula (I), in particular the usual mixtures available commercially, the mean value of the "n" index is a fractional number preferably of between 2 and 5, more preferably in the vicinity of 4. However, the invention can also advantageously be carried out, for example, with alkoxysilane disulfides (n=2).

Mention will more particularly be made, as examples of silane polysulfides, of bis(($C_1$-$C_4$)alkoxyl-($C_1$-$C_4$)alkyl-silyl-($C_1$-$C_4$)alkyl)polysulfides (in particular disulfides, trisulfides or tetrasulfides), such as, for example, bis(3-trimethoxysilylpropyl) or bis(3-triethoxysilylpropyl) polysulfides. Use is in particular made, among these compounds, of bis(3 -triethoxysilylpropyl)tetrasulfide, abbreviated to TESPT, of formula $[(C_2H_5O)_3Si(CH_2)_3S_2]_2$, or bis(triethoxysilylpropyl) disulfide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl) polysulfides, (in particular disulfides, trisulfides or tetrasulfides), more particularly bis(monoethoxydimethylsilylpropyl) tetrasulfide, as disclosed in patent application WO 02/083782 (or US2004/0132880).

Mention will in particular be made, as coupling agent other than alkoxysilane polysulfide, of bifunctional POSs (polyorganosiloxanes) or of hydroxysilane polysulfides ($R^2$=OH in the above formula I), such as disclosed in patent applications WO 02/30939 (or patent U.S. Pat. No. 6,774,255) and WO 02/31041 (or US2004/0051210).

In the rubber compositions in accordance with the invention, the content of coupling agent is preferably between 4 and 12 phr, more preferably between 3 and 8 phr.

The coupling agent could be grafted beforehand to the diene elastomer or to the reinforcing inorganic filler. However, it is preferable, in particular for reasons of better processing of the compositions in the raw state, to use the coupling agent either grafted to the reinforcing inorganic filler or in the free state (i.e., nongrafted).

II-3. Plasticising System

The rubber compositions of the invention have the essential characteristic of using the plasticising system comprising at least:
 between 5 and 35 phr of an MES or TDAE oil;
 between 5 and 35 phr of a fraction/vinylaromatic copolymer resin.

MES and TDAE oils are well known to a person skilled in the art; for example, reference will be made to the recent publication KGK (Kautschuk Gummi Kunstoffe), 52nd year, No. 12/99, pp. 799-805, entitled "Safe Process Oils for Tires with Low Environmental Impact". Patent applications disclosing the use of such oils, as a substitute for conventional aromatic oils, are, for example, EP-A-1 179 560 (or US2002/0045697) or EP-A-1 270 657.

Mention may be made, as examples of MES oils (whether they are of the "extracted" or "hydrotreated" type) or of TDAE oils, for example, of the products sold under the names "Flexon 683" by ExxonMobil, "Vivatec 200" or "Vivatec 500" by H&R European, "Plaxolene MS" by Total, or "Catenex SNR" by Shell.

The resins (it should be remembered that the term "resin" is reserved by definition for a solid compound) formed of $C_5$ fraction/vinylaromatic copolymer, in particular of $C_5$ fraction/styrene or $C_5$ fraction/$C_9$ fraction copolymer, are well known; they have been essentially used to date for application as tackifying agents for adhesives and paints but also as processing aids in tire rubber compositions.

The $C_5$ fraction/vinylaromatic copolymer is, by definition and in a known way, a copolymer of a vinylaromatic monomer and of a $C_5$ fraction.

Stirene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene and any vinylaromatic monomer resulting from a $C_9$ fraction (or more generally from a $C_8$ to $C_{10}$ fraction), for example, are suitable as vinylaromatic monomers. Preferably, the vinylaromatic compound is styrene or a vinylaromatic monomer resulting from a $C_9$ fraction (or more generally from a $C_8$ to $C_{10}$ fraction).

In a known way, the term $C_5$ fraction (or, for example, $C_9$ fraction respectively) is understood to mean any fraction resulting from a process resulting from petrochemistry or from the refining of petroleums, any distillation fraction predominantly comprising compounds having 5 (or respectively 9, in the case of a $C_9$ fraction) carbon atoms; the $C_5$ fractions, for example, may comprise, by way of illustration and without limitation, the following compounds, the relative proportions of which may vary according to the process by which they are obtained, for example according to the origin of the naphtha and the steam cracking process: 1,3-butadiene, 1-butene, 2-butenes, 1,2-butadiene, 3-methyl-1-butene, 1,4-pentadiene, 1-pentene, 2-methyl-1-butene, 2-pentenes, isoprene, cyclopentadiene, which can be present in the form of its dicyclopentadiene dimer, piperylenes, cyclopentene, 1-methylcyclopentene, 1-hexene, methylcyclopentadiene or cyclohexane. These fractions may be obtained by any chemical process known in the petroleum industry and petrochemistry. Mention may be made, as nonlimiting examples, of processes for the steam cracking of naphtha or processes for the fluid catalytic cracking of gasolenes, it being possible for these processes to be combined with any possible chemical treatment for the conversion of these fractions known to a person skilled in the art, such as hydrogenation and dehydrogenation.

Preferably, in said $C_5$ fraction/vinylaromatic copolymer (in particular $C_5$ fraction/styrene or $C_5$ fraction/$C_9$ fraction copolymer), the vinylaromatic compound (in particular styrene or $C_9$ fraction) is the minor monomer, expressed as molar fraction. Thus, more preferably, the percentage of aromatic protons (with regard to the total number of protons of the copolymer), determined in a known way by NMR analysis, is less than 50%, more preferably between 1% and 25% (mol %).

The level of resin formed of $C_5$ fraction/vinylaromatic copolymer has to be between 5 and 35 phr. Below the minimum indicated, the targeted technical effect is inadequate while, above 35 phr, the tackiness of the compositions in the raw state, with regard to the mixing devices, becomes totally unacceptable from the industrial viewpoint. For this reason, this level of resin is preferably between 5 and 25 phr, more preferably between 5 and 20 phr.

That of the MES or TDAE oil is preferably between 10 and 30 phr, more preferably between 10 and 25 phr, while the total plasticising system level of the invention, comprising the MES and/or TDAE oil and the resin, is preferably between 15 and 45 phr, more preferably between 20 and 40 phr.

The resin formed of $C_5$ fraction/vinylaromatic copolymer, in particular of $C_5$ fraction/styrene or $C_5$ fraction/$C_9$ fraction copolymer, exhibits at least one (more preferably all) of the following preferred characteristics:
 a Tg of equal to or greater than 20° C. (more particularly of greater than 25° C.);
 a number-average molecular weight (Mn) of between 400 and 2000 g/mol;
 a polydispersity index (Ip) of less than 4.5 (reminder: Ip=Mw/Mn with Mw the weight-average molecular weight).

More preferably still, this resin exhibits at least one (more preferably all) of the following preferred characteristics:
 a Tg of between 30° C. and 80° C. (more particularly between 35° C. and 60° C.);
 a molecular weight Mn of between 600 and 1500 g/mol;
 a polydispersity index of less than 3.0 (in particular of less than 2.5).

The glass transition temperature Tg is measured in a known way by DSC (Differential Scanning Calorimetry) according to standard ASTM D3418 (1999).

The macrostructure (Mw, Mn and Ip) of the $C_5$ fraction/vinylaromatic copolymer is determined by steric exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standard, set of 3 "Waters" columns in series ("Styragel" HR4E, HR1 and HR0.5); detection by differential refractometer ("Waters 2410") and its associated operating software ("Waters empower").

According to another preferred alternative embodiment of the invention, the $C_5$ fraction/vinylaromatic copolymer (in particular $C_5$ fraction/styrene or $C_5$ fraction/$C_9$ fraction copolymer) resin is devoid of (di)cyclopentadiene (that is to say, cyclopentadiene (CPD) or dicyclopentadiene (DCPD) or mixture of the two) or at the very least comprises a fraction by weight thereof which is less than 30%, preferably less than 20% (% by weight of resin). It has been found that such conditions unexpectedly result, for the tires of the invention, in improved performances in terms of rolling resistance and of grip on wet ground. More preferably, for the same reasons, the level of (D)CPD in the compositions of the invention is chosen within a range from 0 to less than 10%, in particular within a range from 0 to less than 5% (% by weight).

The resins formed of $C_5$ fraction/vinylaromatic copolymer, in particular $C_5$ fraction/styrene or $C_5$ fraction/$C_9$ fraction (more generally $C_5$ fraction/$C_8$-$C_{10}$ fraction) copolymer, are available commercially, for example sold by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", and by Exxon under the names "Escorez 2101 " and "ECR 373".

According to a preferred embodiment of the invention, in particular when the composition of the invention is intended for a tire tread, the plasticising system of the invention additionally comprises between 5 and 35 phr (more generally between 10 and 30 phr) of a glycerol unsaturated ($C_{12}$-$C_{22}$) fatty acid triester, in particular a glycerol trioleate (derived from oleic acid and glycerol), for example present in the form of a sunflower or rapeseed vegetable oil. Such a triester makes it possible to minimize, in said tread, on the one hand, the exsudation of the total plasticising system by compression under rolling and, on the other hand, the migration of said plasticizer towards mixes adjacent to the tread. This is reflected by a settling and a hardening which are also minimized for the tread and, consequently, by the retention over time of the grip performance. In such a case, preferably, the fatty acid (or the combination of fatty acids, if several are present) comprises oleic acid according to a fraction by weight at least equal to 60%, preferably at least equal to 70%.

The plasticising system of the invention might also comprise other nonaromatic or very slightly aromatic plasticizing agents, for example naphthenic or paraffinic oils, other plasticizing hydrocarbon resins exhibiting a high Tg preferably of greater than 25° C., for example resins formed of homo- or copolymers of α-pinene, β-pinene, dipentene (or polylimonene), $C_5$ fraction, in combination with the $C_5$ fraction/ vinylaromatic copolymer resin and the MES or TDAE oil which are described above.

II-4. Various Additives

The rubber compositions in accordance with the invention also comprise all or some of the usual additives generally used in elastomer compositions intended for the manufacture of tires, in particular treads, such as, for example, pigments, protection agents, such as antiozone waxes, chemical antiozonants, antioxidants, antifatigue agents, reinforcing resins, methylene acceptors (for example, phenolic novolak resin) or methylene donors (for example HMT or H3M), as disclosed, for example, in application WO 02/10269 (or US2003/ 212185), a crosslinking system based either on sulfur or on sulfur donors and/or on peroxide and/or on bismaleimides, vulcanization accelerators or vulcanization activators.

These compositions can also comprise, in addition to coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their processing property in the raw state, these agents being, for example, hydrolyzable silanes, such as alkylalkoxysilanes, polyols, polyethers, primary, secondary or tertiary amines or hydroxylated or hydrolyzable polyorganosiloxanes.

II-5. Preparation of the Rubber Compositions

The compositions are manufactured in appropriate mixers using two successive preparation phases well known to a person skilled in the art: a first phase of thermomechanical working or kneading (referred to as "non-productive" phase) at high temperature, up to a maximum 20 temperature of between 110° C. and 190° C., preferably between 130° C. and 180° C., followed by a second phase of mechanical working (referred to as "productive" phase) up to a lower temperature, typically of less than 110° C., for example between 40° C. and 100° C., finishing phase during which the crosslinking system is incorporated.

The process in accordance with the invention for preparing a rubber composition exhibiting an improved abrasion and cut resistance comprises the following stages:

incorporating in a diene elastomer, during a first stage (referred to "non-productive" stage), at least a reinforcing filler and a plasticising system, by kneading thermomechanically the whole, in one or more goes, until a maximum temperature of between 110° C. and 190° C. is reached;

cooling the entire mixture to a temperature of less than 100° C.;

subsequently incorporating, during a second stage (referred as "productive" stage), the crosslinking system;

kneading everything until a maximum temperature of less than 110° C. is reached, and it is characterized in that said plasticising system comprises:

between 5 and 35 phr of an MES or TDAE oil;

between 5 and 35 phr of a $C_5$ fraction/vinylaromatic copolymer (preferably $C_5$ fraction/styrene or $C_5$ fraction/$C_9$ fraction copolymer) resin.

By way of example, the non-productive phase is carried out in a single thermomechanical stage during which, in a first step, all the necessary base constituents (diene elastomer, reinforcing filler and coupling agent, if necessary, plasticising system) are introduced into an appropriate mixer, such as a normal internal mixer, followed, in a second step, for example after kneading for one to two minutes, by the other additives, optional additional covering agents or processing aids, with the exception of the crosslinking system. After cooling the mixture thus obtained, the crosslinking system is then incorporated in an external mixer, such as an open mill, maintained at low temperature (for example, between 40° C. and 100° C.). The whole is then mixed (productive phase) for a few minutes, for example between 2 and 15 min.

The crosslinking system is preferably a vulcanization system based on sulfur and on an accelerator. Use may be made of any compound capable of acting as accelerator of the vulcanization of diene elastomers in the presence of sulfur, in particular those chosen from the group consisting of 2-mercaptobenzothiazyl disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-tert-butyl-2-benzothiazolesulfenamide (abbreviated to "TBBS"), N-tert-butyl-2-benzothiazolesulfenimide (abbreviated to "TBSI") and the mixtures of these compounds. Preferably, a primary accelerator of the sulfenamide type is used.

Additional to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. In the case of use of the composition of the invention as tire tread, the level of sulfur is, for example, between 0.5 and 3.0 phr and that of the primary accelerator is between 0.5 and 5.0 phr.

The final composition thus obtained can subsequently be calandered, for example in the form of a film or a sheet, or else extruded, for example to form a rubber profiled element used for the manufacture of a tire semi-finished product, such as treads, plies or other strips, underlayers, various rubber blocks, which may or may not be reinforced with textile or metal reinforcing elements, intended to form a part of the structure of the tire, very particularly its tread.

The vulcanization (or curing) can subsequently be carried out in a known way at a temperature generally of between 130° C. and 200° C., preferably under pressure, for a sufficient time which can vary, for example, between 5 and 90 min depending in particular on the curing temperature, the vulcanization system adopted and the vulcanization kinetics of the composition under consideration.

The invention relates to the rubber compositions described above both in the "raw" state (i.e., before curing) and in the "cured" or vulcanized state (i.e., after vulcanization).

III.—IMPLEMENTATIONAL EXAMPLES

III-I. Test 1: Tests on Cut and Chipping Resistance

A composition according to the invention (recorded below as C-3) was compared with two control compositions (recorded as C-1 and C-2), the three compositions tested being identical, apart from the differences which follow:
  composition C-1: control according to the prior art with aromatic oil (37 phr);
  composition C-2: control with MES oil alone (31.5 phr);
  composition C-3: composition with plasticising system according to the invention (combination of 11.5 phr of MES oil and of 20 phr of $C_5$ fraction/styrene copolymer resin).

These three compositions, with the exception of their plasticising system, have an usual formulation for a rubber composition for a tire tread, namely, essentially, a blend of diene elastomers (SSBR 70/BR 30), silica (80 phr), carbon black (5 phr) and a vulcanization system. The compositions C-1 and C-2 were formulated with the same volume of plasticizing oil. In the composition C-3, approximately ⅔ (i.e., 20 phr) of MES oil were replaced by a $C_5$ fraction/styrene resin (20 phr of "Super Nevtac 85") in comparison with the control composition C-2.

The three compositions were tested as treads of radial-carcass passenger vehicle tires, with a size of 195/65 R15 (speed index H), conventionally manufactured and in all respects identical apart from the constituent rubber composition of the tread. These tires are recorded respectively as P-1, P-2 and P-3; they were fitted to a passenger vehicle (Citroën model "C5" vehicle—front and rear pressure: 2.2 bar—tires tested fitted at the front of the vehicle—ambient temperature 25° C.) in order to be subjected to the endurance test of section I-4 which makes it possible to assess the cut and chipping resistance of the rubber compositions.

The chipping resistance test demonstrates all the advantage of the composition according to the invention with respect to the two control compositions.

The results are given in table 1 below, in relative units, the base 100 having been selected for the control tire P-1, the tread of which comprises the conventional aromatic oil (a value of greater than 100 indicates an improved performance with respect to the control of base 100):

TABLE 1

|  | Tires No.: | | |
|---|---|---|---|
|  | P-1 | P-2 | P-3 |
| Chipping resistance | 100 | 85 | 113 |

It is noted first of all that the replacement of the aromatic oil by the MES oil (tires P-2 compared with tires P-1) is reflected by an unexpected fall of 15% in the chipping resistance, which is altogether noteworthy and can be regarded as totally unacceptable for certain uses of the tires.

In contrast, the replacement of a portion of the MES oil by the $C_5$ fraction/styrene polymer resin is reflected, surprisingly, by a spectacular recovery in performance (+33% for the tires P-3 in comparison with the tires P-2), the resistance observed with regard to the tires P-3 of the invention even being better by 13% than that of the tires P-1 constituting the starting reference.

III-2. Test 2: Other Rubber Tests

In the tests which follow, the three preceding compositions (C-1 to C-3) were compared in various rubber tests with three other compositions (C-4 to C-6) in accordance with the invention like the preceding composition C-3. These compositions C-4 to C-6 incorporate $C_5$ fraction/styrene copolymer resins additionally comprising, as third monomer, a variable weight fraction of DCPD (dicyclopentadiene).

More specifically, the compositions C-4, C-5 and C-6 are identical to the preceding composition C-3 apart from the nature of the resin used (% by weight):
  composition C-4 (resin A): $C_5$ fraction/styrene/DCPD (5%) copolymer;
  composition C-5 (resin B): $C_5$ fraction/styrene/DCPD (15.5%) copolymer;
  composition C-6 (resin C): $C_5$ fraction/styrene/DCPD (33%) copolymer.

For comparison, the $C_5$ fraction/styrene copolymer (commercial resin) of the resin of the preceding composition C-3 is regarded as virtually devoid (i.e., comprising 0 to less than 5%) of (D)CPD.

For the requirements of this test, the resins of the compositions C-4 to C-6 (respectively recorded as resins A, B and C) were synthesized in a known way according to the following process: a reactor is charged with 1206 ml of toluene and a weight $w_1$ (respectively 8.8 mg, 28 mg and 61 mg for the resins A, B and C) of DCPD. 4.6 g of aluminum trichloride (Aldrich, purity=99%) are subsequently added at a temperature of 25° C. Immediately afterwards, a mixture composed of approximately 61 mg of styrene and of a weight $w_2$ (respectively 105 mg, 88 mg and 56 mg for the resins A, B and C) of a $C_5$ fraction (predominantly isoprene and devoid of (D)CPD) is added dropwise to the suspension over 5 min. The temperature of the reaction medium increases (up to 58° C., 59° C.

and 50° C. respectively) and it is subsequently held constant at 40° C. After polymerizing for 120 min, the reaction is halted with 250 ml of demineralized water. The organic phase is recovered. 1.6 g of 2,2'-methylenebis(4-methyl-6-(tert-butyl)phenol) are added as antioxidant to the resin, still in solution. The majority of the toluene is removed on a rotary evaporator at 70° C. under reduced pressure. The final product is obtained after drying in an oven at 200° C. under reduced pressure.

Resins formed of a copolymer essentially comprising $C_5$ fraction/styrene/DCPD units are thus obtained in the form of a brown-colored material and with a virtually complete conversion of the monomers (94 to 100%, by gas chromatography), the resins having the following fractions by weight:

resin A: 60% of $C_5$ fraction/35% of styrene/5% of DCPD;
resin B: 50.5% of $C_5$ fraction/34% of styrene/15.5% of DCPD;
resin C: 32% of $C_5$ fraction/35% of styrene/33% of DCPD, and respectively having the following Tg, Mn and Ip characteristics:

resin A: Tg=20° C.; Mn=780; Ip=3.1;
resin B: Tg=40° C.; Mn=960; Ip=4.3;
resin C: Tg=31° C.; Mn=835; Ip=4.0.

Tables 2 and 3 give the formulation of the various compositions tested (table 2—levels of the various products, expressed in phr) and their normal properties after curing (table 3). The compositions C-4 to C-6 were formulated like the composition C-3, namely that 20 phr of MES oil were replaced by 20 phr of the resin formed of $C_5$ fraction/styrene/DCPD copolymer.

On reading table 3, it is noted that the properties of all the compositions according to the invention (C-3 to C-6) are substantially identical in terms of Shore hardness as of tensile moduli, under low (10%) as under high (100% and 300%) elongation.

Unexpectedly, the difference between these four compositions lies in the values of $\Delta G^*$, which decrease as the level of DCPD decreases, and in the values of $\tan(\delta)_{max}$ (in temperature), which, for their part, increase as this same level of DCPD decreases. It should be remembered that, in a way well known to a person skilled in the art, the value of $\Delta G^*$ is representative of the hysteresis and of the rolling resistance (the lower $\Delta G^*$, the lower the hysteresis and thus the rolling resistance), while the value of $\tan(\delta)_{max}$ "temperature" measured here (at a given stress, according to a temperature sweep) is known as representative of the potential for grip on wet ground (the greater $\tan(\delta)_{max}$, the better the grip).

It is noted, in passing, that the replacement of the aromatic oil by MES oil (composition C-2 compared with composition C-1) was already reflected by a significant increase in $\Delta G^*$ and a substantial reduction in $\tan(\delta)_{max}$ (in temperature), in other words by a degree of deterioration in the grip/rolling resistance compromise recalled above.

The conclusion of this test is that, for a rolling resistance and a grip on wet ground which are both improved, it is preferable to use $C_5$ fraction/vinylaromatic copolymers resins comprising low levels of (D)CPD, preferably less than 30%, more preferably less than 20%. The best results are, from this viewpoint, obtained with a level of (D)CPD of less than 10%, indeed virtually zero (i.e., zero to less than 5%), for the compositions C-3 and C-4.

The invention thus makes it possible to improve both the rolling resistance and the grip on wet ground of the treads in accordance with the invention while increasing their chipping resistance.

TABLE 2

| | Composition No.: | | | | | |
|---|---|---|---|---|---|---|
| | C-1 | C-2 | C-3 | C-4 | C-5 | C-6 |
| S-SBR (1) | 70 | 70 | 70 | 70 | 70 | 70 |
| BR (2) | 30 | 30 | 30 | 30 | 30 | 30 |
| Silica (3) | 80 | 80 | 80 | 80 | 80 | 80 |
| Coupling agent (4) | 6.4 | 6.4 | 6.4 | 6.4 | 6.4 | 6.4 |
| Carbon black (5) | 5 | 5 | 5 | 5 | 5 | 5 |
| Aromatic oil (6) | 37 | — | — | — | — | — |
| MES oil (7) | — | 31.5 | 11.5 | 11.5 | 11.5 | 11.5 |
| Resin (8) | — | — | 20 | — | — | — |
| Resin (9) | — | — | — | 20 | — | — |
| Resin (10) | — | — | — | — | 20 | — |
| Resin (11) | — | — | — | — | — | 20 |
| ZnO (12) | 1.5 | 1.5 | 1.5 | 1.5 | 1.5 | 1.5 |
| Stearic acid (13) | 2 | 2 | 2 | 2 | 2 | 2 |
| Antioxidant (14) | 1.9 | 1.9 | 1.9 | 1.9 | 1.9 | 1.9 |
| DPG (15) | 1.5 | 1.5 | 1.5 | 1.5 | 1.5 | 1.5 |
| Sulfur | 1 | 1 | 1 | 1 | 1 | 1 |
| Accelerator (16) | 2 | 2 | 2 | 2 | 2 | 2 |

(1) Oil-extended SBR solution (level expressed as dry SBR); 25% of stirene, 58% of 1,2-polybutadiene units and 23% of trans-1,4-polybutadiene units (Tg = –24° C.);
(2) BR with 4.3% of 1,2-; 2.7% of trans; 93% of cis-1,4- (Tg = –106° C.);
(3) Silica "Zeosil 1165MP" from Rhodia, "HD" type (BET and CTAB: approximately 160 m²/g);
(4) Coupling agent TESPT ("Si69" from Degussa);
(5) Carbon black N234 (ASTM grade);
(6) Total aromatic oil (including extending oil for the SBR);
(7) Total MES oil (including extending oil for the SBR - Catenex SNR de Shell);
(8) $C_5$ fraction/styrene resin ("Super Nevtac 85" from Neville Chemical Company);
(9) Resin A (5% of DCPD);
(10) Resin B (15.5% of DCPD);
(11) Resin C (33% of DCPD);
(12) Zinc oxide (industrial grade - Umicore);
(13) Stearin ("Pristerene 4931" - Uniqema);
(14) N-(1,3-Dimethylbutyl)-N-phenyl-para-phenylenediamine (Santoflex 6-PPD from Flexsys);
(15) Diphenylguanidine (Perkacit DPG from Flexsys);
(16) N-Cyclohexyl-2-benzothiazolesulfenamide (Santocure CBS from Flexsys).

TABLE 3

| | Composition No.: | | | | | |
|---|---|---|---|---|---|---|
| | C-1 | C-2 | C-3 | C-4 | C-5 | C-6 |
| Shore hardness | 64 | 65 | 65 | 67 | 67 | 68 |
| M10 (MPa) | 4.8 | 4.7 | 4.8 | 5.2 | 5.3 | 5.6 |
| M100 (MPa) | 1.6 | 1.8 | 1.7 | 1.8 | 1.8 | 1.8 |
| M300 (MPa) | 1.9 | 2.2 | 2.1 | 2.1 | 2.1 | 2.1 |
| $\tan(\delta)_{max}$ (in temperature) | 0.70 | 0.66 | 0.72 | 0.68 | 0.66 | 0.64 |
| $\Delta G^*$ (MPa) | 4.08 | 4.47 | 3.84 | 3.98 | 4.63 | 4.80 |

The invention claimed is:

1. A rubber composition based on at least a diene elastomer, a reinforcing filler, a plasticising system and a crosslinking system, wherein said plasticising system comprises (phr=parts by weight per hundred parts of elastomer):
   between 5 and 35 phr of an MES or TDAE oil;
   between 5 and 35 pbr of a $C_5$ fraction/vinylaromatic copolymer resin.

2. The composition according to claim 1, the level of resin being between 5 and 25 phr.

3. The composition according to claim 1, the glass transition temperature of the resin being equal to or greater than 20° C.

4. The composition according to claim 1, the number-average molecular weight of the resin being between 400 and 2000 g/mol.

5. The composition according to claim 1, the copolymer being a $C_5$ fraction and styrene copolymer.

6. The composition according to claim 1, the copolymer being a $C_5$ fraction and $C_8$-$C_{10}$ fraction copolymer.

7. The composition according to claim 1, the copolymer being a $C_5$ fraction and $C_9$ fraction copolymer.

8. The composition according to claim 1, the level of MES or TDAE oil being between 10 and 30 phr.

9. The composition according to claim 1, the total plasticising system level being between 15 and 45 phr.

10. The composition according to claim 1, the diene elastomer being chosen from the group consisting of polybutadienes, natural rubber, synthetic polyisoprenes, butadiene copolymers, isoprene copolymers and the blends of these elastomers.

11. The composition according to claim 1, the plasticising system additionally comprising between 5 and 35 phr of a glycerol unsaturated ($C_{12}$-$C_{22}$) fatty acid triester.

12. The composition according to claim 11, the triester being a glycerol trioleate.

13. The composition according to claim 1, the reinforcing filler being present at a level of between 20 and 200 phr.

14. The composition according to claim 1, the $C_5$ fractionl/vinylaromatic copolymer resin comprising 0 (zero) to less than 30% by weight of (di)cyclopentadiene.

15. The composition according to claim 14, the $C_5$ fraction/vinylaromatic copolymer resin comprising 0 to less than 20% by weight of (di)cyclopentadiene.

16. The composition according to claim 15, the $C_5$ fraction/vinylaromatic copolymer resin comprising 0 to less than 5% by weight of (di)cyclopentadiene.

17. A process for preparing a rubber composition based on a diene elastomer, a reinforcing filler, a plasticising system and a crosslinking system, said process comprising the following stages:
   incorporating in a diene elastomer, during a first referred to as "non-productive" stage, at least a reinforcing filler and a plasticising system, by kneading thermomechanically the whole, in one or more goes, until a maximum temperature of between 110° C. and 190° C. is reached;
   cooling the entire mixture to a temperature of less than 100° C.;
   subsequently incorporating, during a second referred to as "productive" stage, the crosslinking system;
   kneading everything until a maximum temperature of less than 110° C. is reached,
and wherein said plasticising system comprises:
   between 5 and 35 phr of an MES or TDAE oil;
   between 5 and 35 phr of a $C_5$ fraction/vinylaromatic copolyrner resin.

18. The process according to claim 17, the level of resin being between 5 and 25 phr.

19. The process according to claim 17, the glass transition temperature of the resin being equal to or greater than 20° C.

20. The process according to claim 17, the number-average molecular weight (Mn) of the resin being between 400 and 2000 g/mol.

21. The process according to claim 17, the copolymer being a $C_5$ fraction and styrene copolymer.

22. The process according to claim 17, the copolymer being a $C_5$ fraction and $C_8$-$C_{10}$ fraction copolymer.

23. The process according to claim 17, the copolymer being a $C_5$ fraction and $C_9$ fraction copolymer.

24. The process according to claim 17, the level of MES or TDAE oil being between 10 and 30 Ophr.

25. The process according to claim 17, the total plasticising system level being between 15 and 45 phr.

26. The process according to claim 17, the diene elastomer being chosen from the group consisting of polybutadienes, natural rubber, synthetic polyisoprenes, butadiene copolymers, isoprene copolymers and the blends of these elastomers.

27. The process according to claim 17, the plasticising system additionally comprising between 5 and 35 phr of a glycerol unsaturated ($C_{12}$-$C_{22}$) fatty acid triester.

28. The processaccording to claim 27, the triester being a glycerol trioleate.

29. The process according to claim 17, the reinforcing filler being present at a level of between 20 and 200 phr.

30. The process according to claim 17, the $C_5$ fraction/vinylaromatic copolymer resin comprising 0 (zero) to less than 30% by weight of (di)cyclopentadiene.

31. The process according to claim 30, the $C_5$ fraction/vinylaromatic copolymer resin comprising 0 to less than 20% by weight of (di)eyclopentadienc.

32. The composition according to claim 31, the $C_5$ fraction/vinylaromatic copolymer resin comprising 0 to less than 5% by weight of (di)cyelopentadiene.

33. A finished article or semi-finished product intended for a motor vehicle ground-contact system comprising a composition according to claim 1.

34. A plasticising system which can be used for the plasticizing of a diene rubber composition, comprising an MES or TDAE oil and a $C_5$ fraction/vinylaromatic copolymer resin.

35. The plasticising system according to claim 34, the glass transition temperature of the resin being equal to or greater than 20° C.

36. The plasticising system according to claim 34, the number-average molecular weight of the resin being between 400 and 2000 g/mol.

37. The plasticising system according to claim 34, the copolymer of the resin being a $C_5$ fraction and styrene copolymer.

38. The plasticising system according to claim 34, the copolymer of the resin being a $C_5$ fraction and $C_8$-$C_{10}$ fraction copolymer.

39. The plasticising system according to claim 34, the copolymer of the resin being a $C_5$ fraction and $C_9$ fraction copolymer.

40. The plasticising system according to claim 34, additionally comprising between 5 and 35 phr of a glycerol unsaturated ($C_{12}$-$C_{22}$) fatty acid triester.

41. The plasticising system according to claim 40, the triester being a glycerol trioleate.

42. The plasticising system according to claim 34, the resin formed of $C_5$ fraction/vinylaromatic copolymer comprising 0 (zero) to less than 30% by weight of (di)cyclopentadicne.

43. The plasticising system according to claim 42, the resin formed of Cs fraction/vinylaromatic copolymer comprising 0 to less than 20% by weight of (di)cyclopentadiene.

44. The plasticising system according to claim 43, the resin formed of $C_5$ fraction/vinylaromatic copolymer comprising 0 to less than 5% by weight of (di)cyclopentadiene.

45. A fire tread comprising a composition according to claim 1.

46. A tire tread comprising a plasticising system according to claim 34.

47. A tire comprising a tread according to claim 45.

48. A tire comprising a composition according to claim 1.

49. A tire comprising a plasticising system according to claim 34.

* * * * *